US012725220B2

(12) United States Patent
Zhang et al.

(10) Patent No.: US 12,725,220 B2
(45) Date of Patent: Sep. 1, 2026

(54) DISPLAY DRIVER THREAD RUN-TIME SCHEDULING

(71) Applicant: QUALCOMM Incorporated, San Diego, CA (US)

(72) Inventors: Nan Zhang, Beijing (CN); Yongjun Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 43 days.

(21) Appl. No.: 18/856,042

(22) PCT Filed: May 30, 2022

(86) PCT No.: PCT/CN2022/095869
§ 371 (c)(1),
(2) Date: Oct. 10, 2024

(87) PCT Pub. No.: WO2023/230744
PCT Pub. Date: Dec. 7, 2023

(65) Prior Publication Data
US 2025/0252525 A1 Aug. 7, 2025

(51) Int. Cl.
*G06T 1/20* (2006.01)
*G06F 9/48* (2006.01)
(Continued)

(52) U.S. Cl.
CPC .............. *G06T 1/20* (2013.01); *G06F 9/4881* (2013.01); *G06T 1/60* (2013.01); *H04N 7/0127* (2013.01)

(58) Field of Classification Search
CPC . G06T 1/20; G06T 1/60; G06F 9/4881; G06F 1/3218; G06F 9/5016;
(Continued)

(56) References Cited

U.S. PATENT DOCUMENTS 9,047,396 B2 * 6/2015 Chen ........................ G06F 9/524
10,649,790 B1 * 5/2020 Ingegneri .............. G06F 9/4405
(Continued)

FOREIGN PATENT DOCUMENTS

CN 108958574 A 12/2018
WO 2021248370 A1 12/2021

OTHER PUBLICATIONS

International Search Report and Written Opinion—PCT/CN2022/095869—ISA/CN—Dec. 21, 2022.
(Continued)

*Primary Examiner* — David T Welch
(74) *Attorney, Agent, or Firm* — Procopio Cory Hargreaves & Savitch LLP

(57) ABSTRACT

Aspects presented herein relate to methods and devices for display processing including an apparatus, e.g., a CPU or a DPU. The apparatus may monitor at least one display task associated with a set of display software threads. The apparatus may also detect that a loading time of the at least one display task is less than a loading time threshold or that a panel frame rate is less than a frame rate threshold. Further, the apparatus may obtain a first configuration for at least one thread of the set of display software threads and a second configuration for the at least one thread. The apparatus may also adjust an execution of the at least one display task from being associated with the first configuration for the at least one thread to being associated with the second configuration for the at least one thread.

30 Claims, 10 Drawing Sheets

(51) Int. Cl.
*G06T 1/60* (2006.01)
*H04N 7/01* (2006.01)

(58) Field of Classification Search
CPC .... G06F 1/3265; H04N 7/0127; G09G 5/001; G09G 2340/0435; G09G 2360/08; G09G 5/363
USPC .......................................................... 345/506
See application file for complete search history.

(56) References Cited

U.S. PATENT DOCUMENTS

| | | | | |
|---|---|---|---|---|
| 10,902,341 | B1 * | 1/2021 | Qureshi | G06Q 10/10 |
| 11,593,477 | B1 * | 2/2023 | Thimmegowda | G06F 21/552 |
| 11,842,669 | B1 * | 12/2023 | Von Hippel | G06F 3/1431 |
| 2007/0074216 | A1 * | 3/2007 | Adachi | G06F 1/3203 718/102 |
| 2014/0109102 | A1 * | 4/2014 | Duncan | G06F 9/3851 718/103 |
| 2014/0181834 | A1 * | 6/2014 | Lim | G06F 9/5088 718/105 |
| 2016/0026504 | A1 * | 1/2016 | Finnigan | G06F 9/4881 718/105 |
| 2017/0244890 | A1 | 8/2017 | Lee et al. | |
| 2018/0308205 | A1 * | 10/2018 | Vembu | G06F 1/3234 |
| 2019/0096023 | A1 * | 3/2019 | Diefenbaugh | G09G 3/002 |
| 2019/0123766 | A1 | 4/2019 | Huang | |
| 2019/0236749 | A1 * | 8/2019 | Gould | G06T 1/20 |
| 2020/0379815 | A1 * | 12/2020 | Banerjee | G06T 1/20 |
| 2021/0041937 | A1 | 2/2021 | Zhang et al. | |
| 2021/0142749 | A1 | 5/2021 | Han et al. | |
| 2022/0122566 | A1 * | 4/2022 | Schluessler | G09G 5/18 |
| 2022/0130342 | A1 | 4/2022 | Jain et al. | |
| 2023/0195520 | A1 * | 6/2023 | Neyman | G06F 9/5005 718/104 |
| 2024/0231904 | A1 * | 7/2024 | Nakamura | G06F 9/48 |
| 2025/0190252 | A1 * | 6/2025 | Li | G06F 9/4881 |
| 2025/0252525 | A1 * | 8/2025 | Zhang | G06F 9/5016 |

OTHER PUBLICATIONS

Supplementary European Search Report EP22944088 Search Authority Munich Nov. 12, 2025.

* cited by examiner

Figure 4:
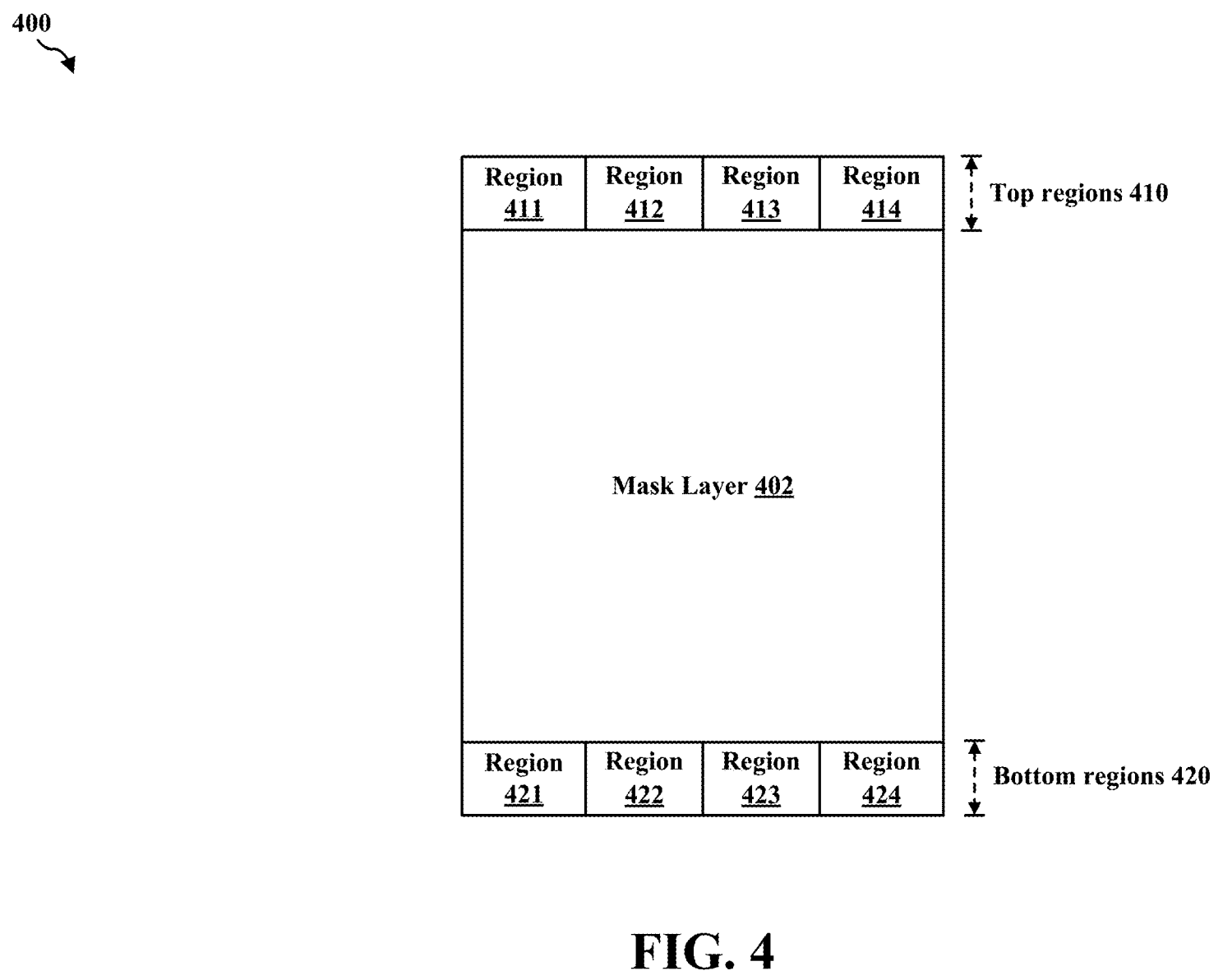

400

Top regions 410

Region 411

Region 412

Region 413

Region 414

Mask Layer 402

Bottom regions 420

Region 421

Region 422

Region 423

Region 424

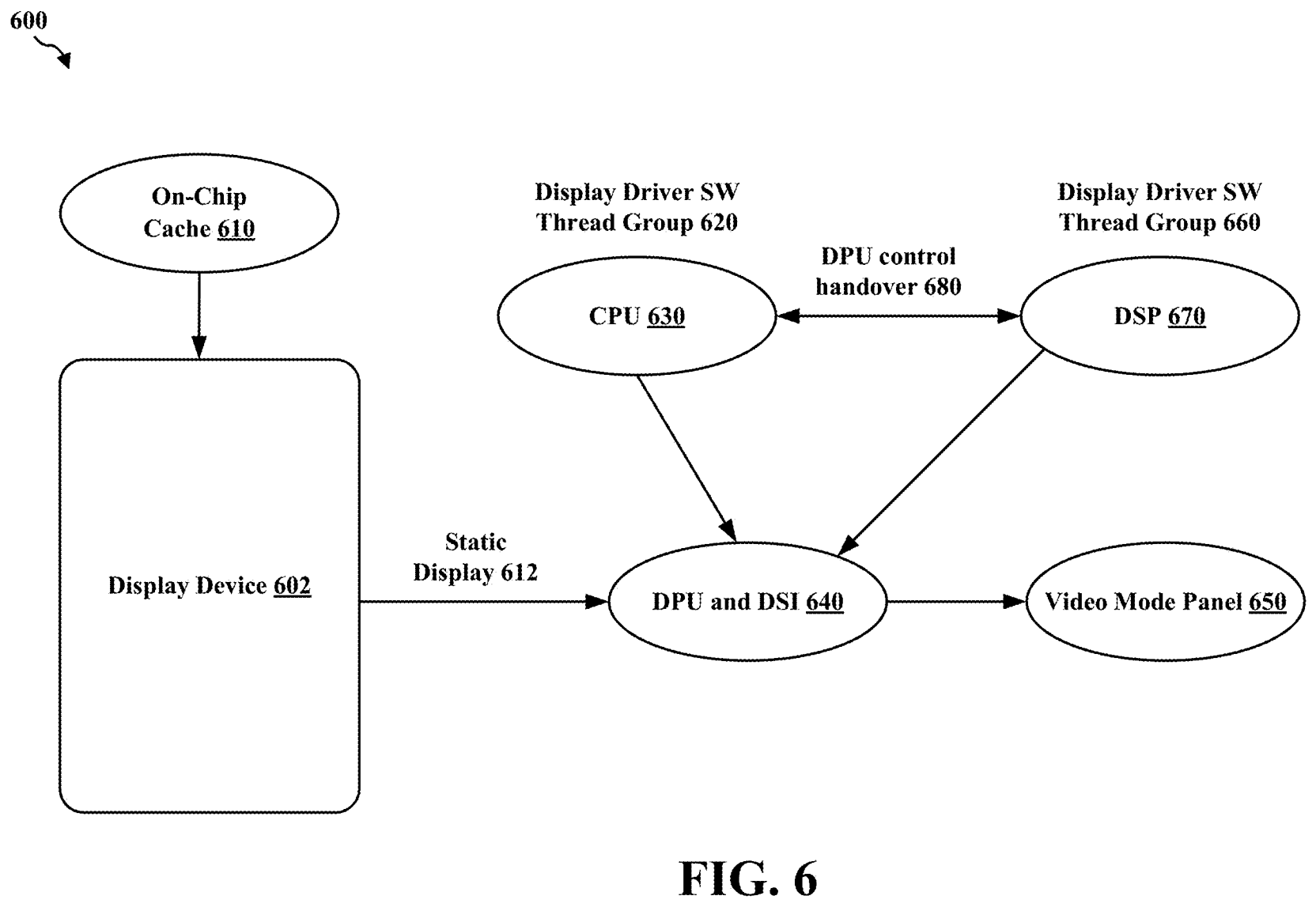

On-Chip Cache 610

Display Device 602

Static Display 612

Display Driver SW Thread Group 620

CPU 630

DPU control handover 680

Display Driver SW Thread Group 660

DSP 670

DPU and DSI 640

Video Mode Panel 650

FIG. 6

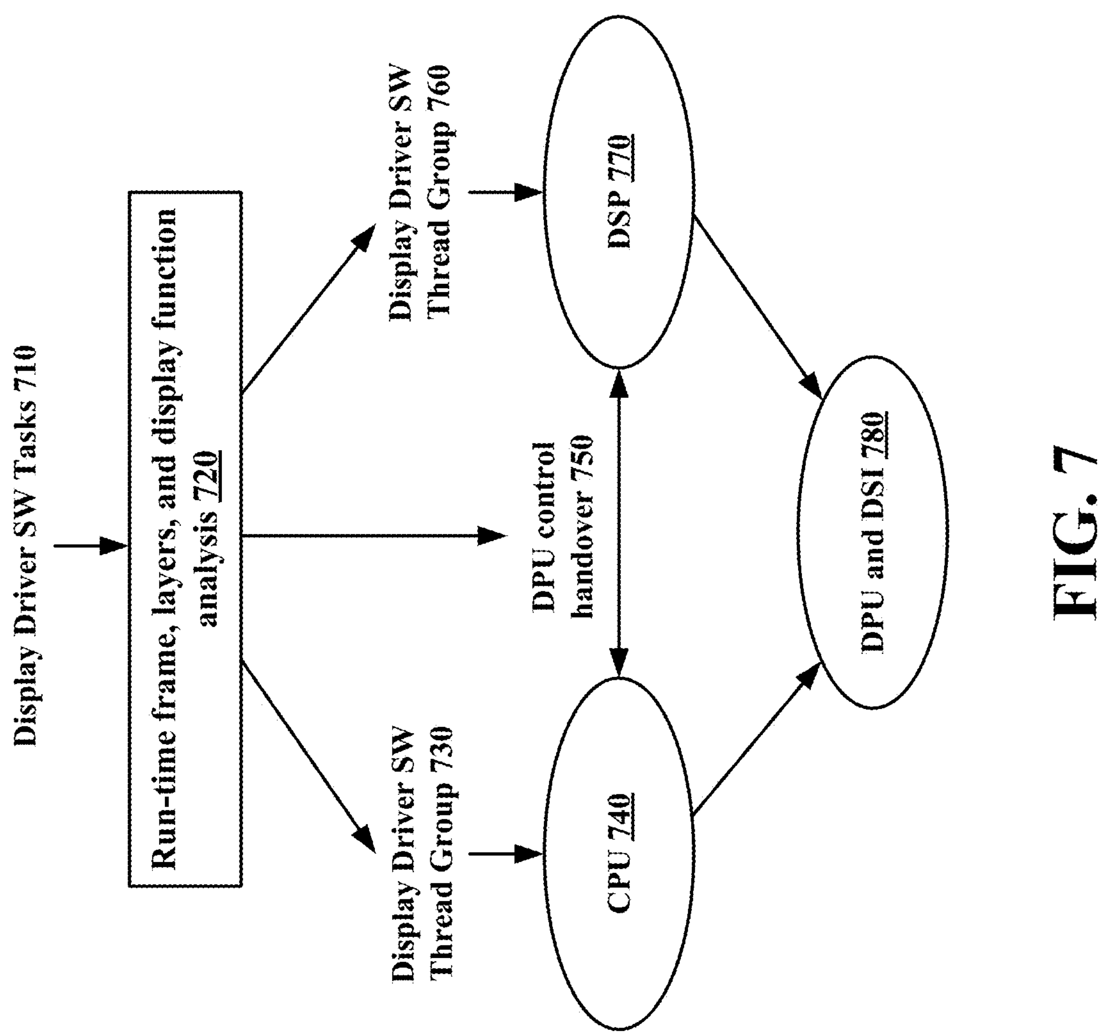
FIG. 7

DISPLAY DRIVER THREAD RUN-TIME SCHEDULING

CROSS REFERENCE TO RELATED APPLICATION(S)

This application is a National Stage Application filed under 35 U.S.C. § 371 of PCT International Application No. PCT/CN2022/095869, entitled "DISPLAY DRIVER THREAD RUN-TIME SCHEDULING" and filed May 30, 2022, which is expressly incorporated by reference herein in its entirety.

TECHNICAL FIELD

The present disclosure relates generally to processing systems and, more particularly, to one or more techniques for display processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or display processing.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a display processing unit (DPU) or any apparatus that may perform display processing. The apparatus may monitor at least one display task associated with a set of display software threads, where the set of display software threads corresponds to a set of display features. The apparatus may also detect that a loading time of the at least one display task is less than a loading time threshold or that a panel frame rate is less than a frame rate threshold. Additionally, the apparatus may adjust the panel frame rate based on the loading time of the at least one display task being less than the loading time threshold or the panel frame rate being less than the frame rate threshold. The apparatus may also adjust a frame buffer cache from a double data rate (DDR) memory to an on-chip cache during a display processing unit (DPU) control task handover, where the frame buffer cache is adjusted based on detecting that the loading time of the at least one display task is less than the loading time threshold or that the panel frame rate is less than the frame rate threshold. Moreover, the apparatus may detect a lack of an update to a frame buffer cache based on the loading time of the at least one display task being less than the loading time threshold or the panel frame rate being less than the frame rate threshold; and write back a previous frame content update to a current frame based on detecting the lack of the update to the frame buffer cache. The apparatus may also obtain a first configuration for at least one thread of the set of display software threads and a second configuration for the at least one thread based on the loading time of the at least one display task being less than the loading time threshold or the panel frame rate being less than the frame rate threshold. The apparatus may also adjust an execution of the at least one display task from being associated with the first configuration for the at least one thread to being associated with the second configuration for the at least one thread.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 4 is a diagram illustrating an example mask layer for display processing.

FIG. 6 is a diagram illustrating an example display thread procedure for a display device in display processing.

FIG. 7 is a diagram illustrating an example display thread procedure for a display device in display processing.

DETAILED DESCRIPTION

Figure 1:
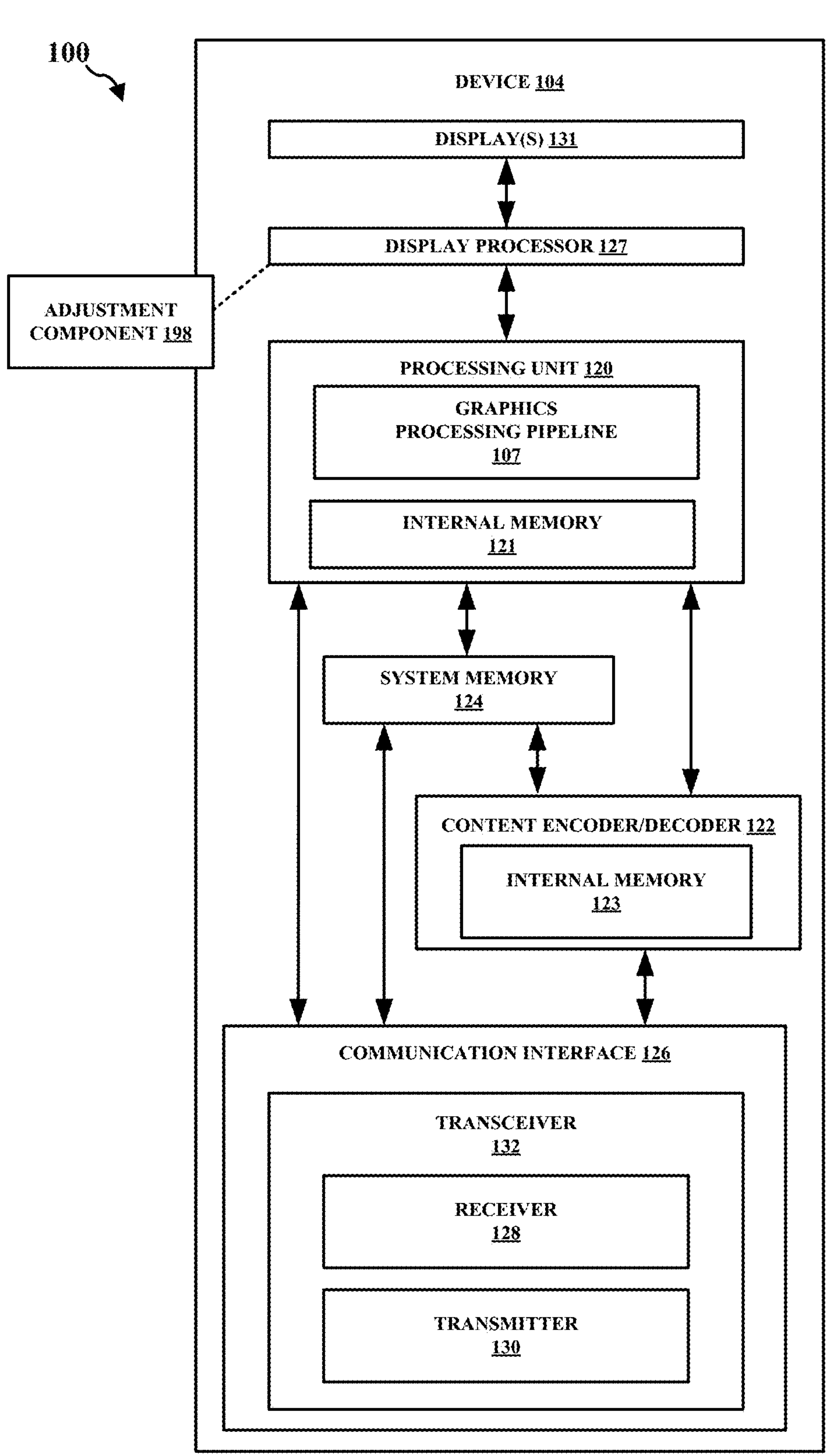
FIG. 1 is a block diagram that illustrates an example content generation system.

Some aspects of display processing may utilize different types of display panels, such as video mode panels or command mode panels. Video mode panels may be utilized when a display does not provide internal memory for the display data, while command mode panels may be utilized when the display has access to the internal frame buffer memory. Certain types of video mode panels may support a variety of refresh rates (e.g., refresh rates of 1 Hz to 120 Hz). This may result in a host chip that is controlling the video mode to experience a decent amount of power consumption. For instance, the host chip may need to refresh at a certain frame rate (e.g., 1 frame-per-second (FPS)). In some aspects, certain frame rates may be utilized with different types of content and different levels of light. As smart phones and user equipments (UEs) become more advanced, any advantages of command mode panels may decrease, and the disadvantages of command mode panels may become more obvious. For example, command mode panels may be more expensive compared to video mode panels. Also, command mode panels may become less desirable if a power consumption advantage disappears compared to video mode panels. Moreover, the increased utilization of certain types of display panels may result in video mode panels becoming more relevant. Accordingly, there are an increasing number of reasons to utilize video mode panels over command mode panels. Some types of static displays may be designed to use a controller to cache an image from a memory. In some instances, if a content updating idle occurs, a certain buffer may be written to the controller to reduce an amount of access at a DDR memory. By doing so, compared to a regular frame refreshing, the display driver software (SW) thread run-time at a CPU may be reduced a significant amount. This may be due to a reduced amount of programming and/or a reduced amount of software event controlling. However, a thread that runs in the CPU as a real time thread may still contribute to power consumption. This lightweight display thread may still be a CPU real-time task which may keep the CPU awake and may contribute to the consumed CPU power. In one instance, display software threads may contribute to a high amount of CPU power utilization, as they are a frequently running on a real-time thread in the CPU. As indicated herein, some video mode static display solutions may keep the CPU active while running software threads. By doing so, a high amount of power at the CPU may be utilized. Further, these video mode static display solutions may experience a high amount of DDR memory accessing. Aspects of the present disclosure may utilize methods to reduce the amount of power utilized at a CPU for display driver software threads. For instance, aspects of the present disclosure may reduce the amount of power utilized at a CPU for display driver software threads during a static display (i.e., video mode). For example, aspects of the present disclosure may provide software vendors a solution to reduce the amount of power utilized at the CPU for display driver software threads. Additionally, in some instances, aspects of the present disclosure may allow for a reduction in an amount of DDR memory accessing associated with the display driver software threads. Moreover, aspects presented herein may schedule display software threads in order to solve the aforementioned power consumption issues. For instance, aspects presented herein may schedule display software threads at CPUs and digital signal processors (DSPs) (e.g., low power DSPs) for static displays and other scenarios.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the display processor 127 may include an adjustment component 198 configured to monitor at least one display task associated with a set of display software threads, where the set of display software threads corresponds to a set of display features. The adjustment component 198 may also be configured to detect that a loading time of the at least one display task is less than a loading time threshold or that a panel frame rate is less than a frame rate threshold. The adjustment component 198 may also be configured to adjust the panel frame rate based on the loading time of the at least one display task being less than the loading time threshold or the panel frame rate being less than the frame rate threshold. The adjustment component 198 may also be configured to adjust a frame buffer cache from a double data rate (DDR) memory to an on-chip cache during a display processing unit (DPU) control task handover, where the frame buffer cache is adjusted based on detecting that the loading time of the at least one display task is less than the loading time threshold or that the panel frame rate is less than the frame rate threshold. The adjustment component 198 may also be configured to detect a lack of an update to a frame buffer cache based on the loading time of the at least one display task being less than the loading time threshold or the panel frame rate being less than the frame rate threshold; and write back a previous frame content update to a current frame based on detecting the lack of the update to the frame buffer cache. The adjustment component 198 may also be configured to obtain a first configuration for at least one thread of the set of display software threads and a second configuration for the at least one thread based on the loading time of the at least one display task being less than the loading time threshold or the panel frame rate being less than the frame rate threshold. The adjustment component 198 may also be configured to adjust an execution of the at least one display task from being associated with the first configuration for the at least one thread to being associated with the second configuration for the at least one thread. Although the following description may be focused on display processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher (VFD), a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a VFD, may use these states to determine certain functions, e.g., how a vertex is assembled. As these modes or states may change, GPUs may need to change the corresponding context. Additionally, the workload that corresponds to the mode or state may follow the changing mode or state.

Figure 2:
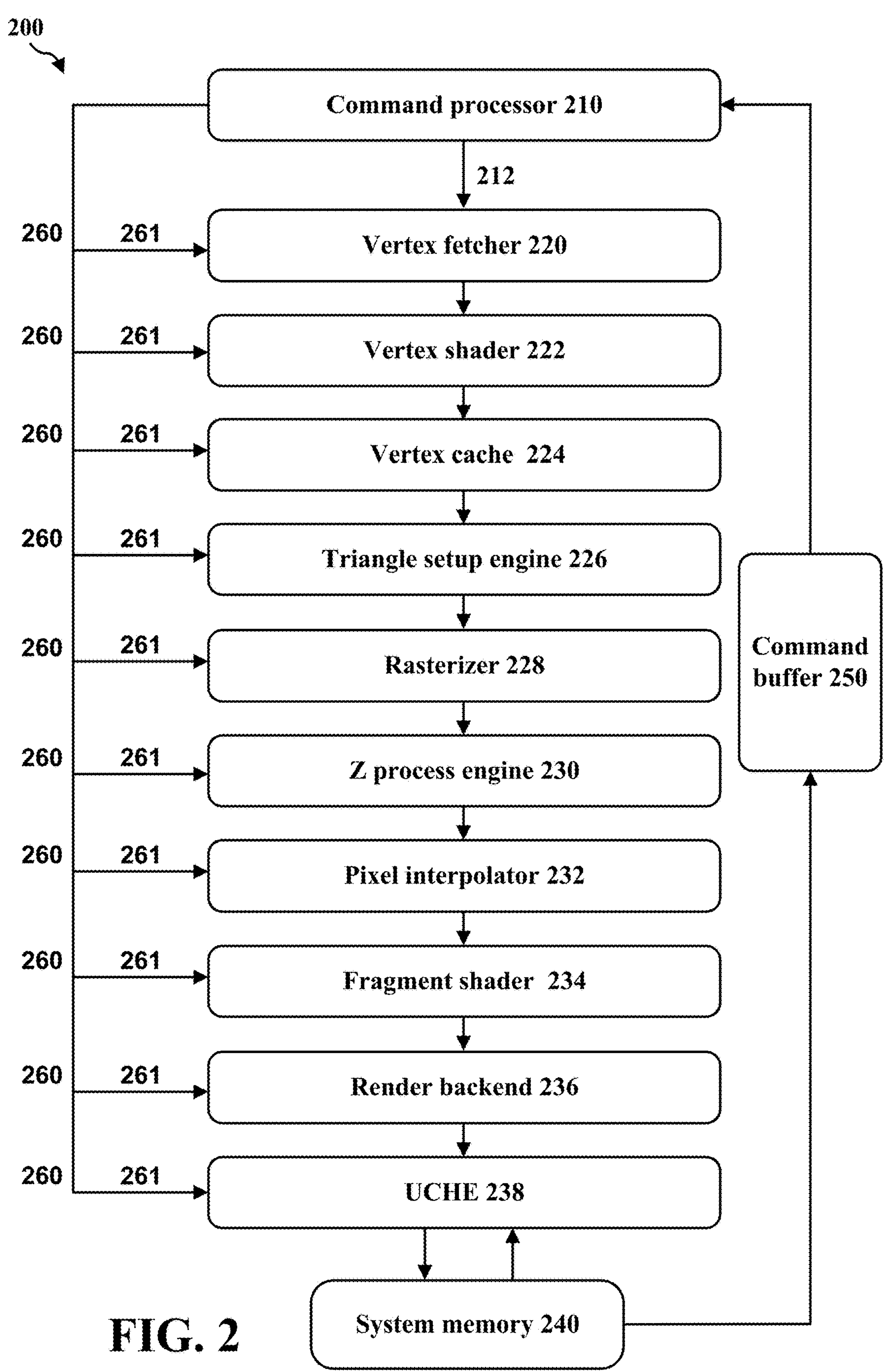
FIG. 2 illustrates an example graphics processing unit (GPU).

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUs according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1.

GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

Figure 3:
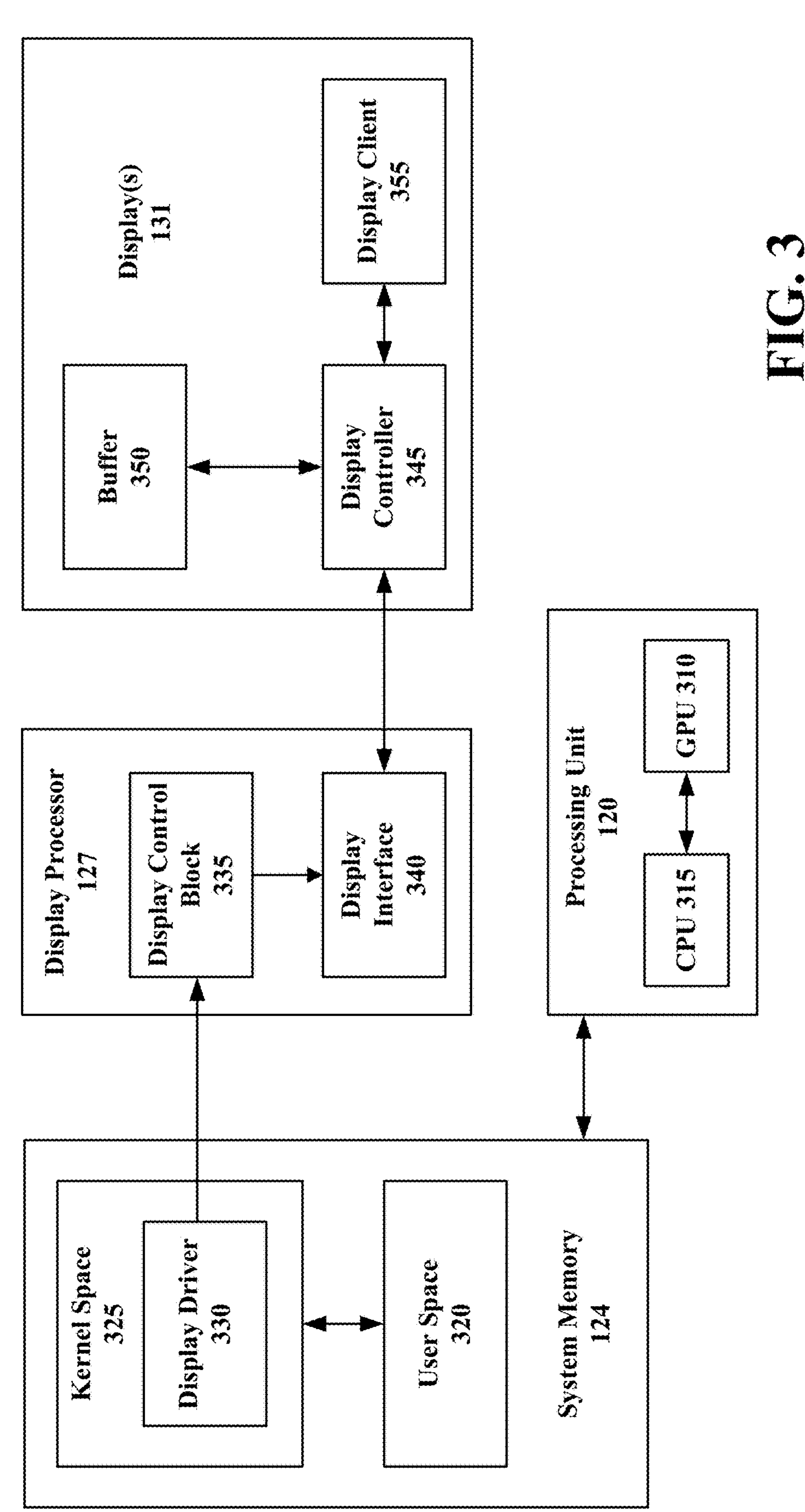
FIG. 3 illustrates an example display framework including a display processor and a display.

FIG. 3 is a block diagram 300 that illustrates an example display framework including the processing unit 120, the system memory 124, the display processor 127, and the display(s) 131, as may be identified in connection with the device 104.

A GPU may be included in devices that provide content for visual presentation on a display. For example, the processing unit 120 may include a GPU 310 configured to render graphical data for display on a computing device (e.g., the device 104), which may be a computer workstation, a mobile phone, a smartphone or other smart device, an embedded system, a personal computer, a tablet computer, a video game console, and the like. Operations of the GPU 310 may be controlled based on one or more graphics processing commands provided by a CPU 315. The CPU 315 may be configured to execute multiple applications concurrently. In some cases, each of the concurrently executed multiple applications may utilize the GPU 310 simultaneously. Processing techniques may be performed via the processing unit 120 output a frame over physical or wireless communication channels.

The system memory 124, which may be executed by the processing unit 120, may include a user space 320 and a kernel space 325. The user space 320 (sometimes referred to as an "application space") may include software application(s) and/or application framework(s). For example, software application(s) may include operating systems, media applications, graphical applications, workspace applications, etc. Application framework(s) may include frameworks used by one or more software applications, such as libraries, services (e.g., display services, input services, etc.), application program interfaces (APIs), etc. The kernel space 325 may further include a display driver 330. The display driver 330 may be configured to control the display processor 127. For example, the display driver 330 may cause the display processor 127 to compose a frame and transmit the data for the frame to a display.

The display processor 127 includes a display control block 335 and a display interface 340. The display processor 127 may be configured to manipulate functions of the display(s) 131 (e.g., based on an input received from the display driver 330). The display control block 335 may be further configured to output image frames to the display(s) 131 via the display interface 340. In some examples, the display control block 335 may additionally or alternatively perform post-processing of image data provided based on execution of the system memory 124 by the processing unit 120.

The display interface 340 may be configured to cause the display(s) 131 to display image frames. The display interface 340 may output image data to the display(s) 131 according to an interface protocol, such as, for example, the MIPI DSI (Mobile Industry Processor Interface, Display Serial Interface). That is, the display(s) 131, may be configured in accordance with MIPI DSI standards. The MIPI DSI standard supports a video mode and a command mode. In examples where the display(s) 131 is/are operating in video mode, the display processor 127 may continuously refresh the graphical content of the display(s) 131. For example, the entire graphical content may be refreshed per refresh cycle (e.g., line-by-line). In examples where the display(s) 131 is/are operating in command mode, the display processor 127 may write the graphical content of a frame to a buffer 350.

In some such examples, the display processor 127 may not continuously refresh the graphical content of the display (s) 131. Instead, the display processor 127 may use a vertical synchronization (Vsync) pulse to coordinate rendering and consuming of graphical content at the buffer 350. For example, when a Vsync pulse is generated, the display processor 127 may output new graphical content to the buffer 350. Thus, generation of the Vsync pulse may indicate that current graphical content has been rendered at the buffer 350.

Frames are displayed at the display(s) 131 based on a display controller 345, a display client 355, and the buffer 350. The display controller 345 may receive image data from the display interface 340 and store the received image data in the buffer 350. In some examples, the display controller 345 may output the image data stored in the buffer 350 to the display client 355. Thus, the buffer 350 may represent a local memory to the display(s) 131. In some examples, the display controller 345 may output the image data received from the display interface 340 directly to the display client 355.

The display client 355 may be associated with a touch panel that senses interactions between a user and the display (s) 131. As the user interacts with the display(s) 131, one or more sensors in the touch panel may output signals to the display controller 345 that indicate which of the one or more sensors have sensor activity, a duration of the sensor activity, an applied pressure to the one or more sensor, etc. The display controller 345 may use the sensor outputs to determine a manner in which the user has interacted with the display(s) 131. The display(s) 131 may be further associated with/include other devices, such as a camera, a microphone, and/or a speaker, that operate in connection with the display client 355.

Some processing techniques of the device 104 may be performed over three stages (e.g., stage 1: a rendering stage; stage 2: a composition stage; and stage 3: a display/transfer stage). However, other processing techniques may combine the composition stage and the display/transfer stage into a single stage, such that the processing technique may be executed based on two total stages (e.g., stage 1: the rendering stage; and stage 2: the composition/display/transfer stage). During the rendering stage, the GPU 310 may process a content buffer based on execution of an application that generates content on a pixel-by-pixel basis. During the composition and display stage(s), pixel elements may be assembled to form a frame that is transferred to a physical display panel/subsystem (e.g., the displays 131) that displays the frame.

Instructions executed by a CPU (e.g., software instructions) or a display processor may cause the CPU or the display processor to search for and/or generate a composition strategy for composing a frame based on a dynamic priority and runtime statistics associated with one or more composition strategy groups. A frame to be displayed by a physical display device, such as a display panel, may include a plurality of layers. Also, composition of the frame may be based on combining the plurality of layers into the frame (e.g., based on a frame buffer). After the plurality of layers are combined into the frame, the frame may be provided to the display panel for display thereon. The process of combining each of the plurality of layers into the frame may be referred to as composition, frame composition, a composition procedure, a composition process, or the like.

A frame composition procedure or composition strategy may correspond to a technique for composing different layers of the plurality of layers into a single frame. The plurality of layers may be stored in doubled data rate (DDR) memory. Each layer of the plurality of layers may further correspond to a separate buffer. A composer or hardware composer (HWC) associated with a block or function may determine an input of each layer/buffer and perform the frame composition procedure to generate an output indicative of a composed frame. That is, the input may be the layers and the output may be a frame composition procedure for composing the frame to be displayed on the display panel.

Some aspects of display processing may utilize different types of mask layers, e.g., a shape mask layer. A mask layer is a layer that may represent a portion of a display or display panel. For instance, an area of a mask layer may correspond to an area of a display, but the entire mask layer may depict a portion of the content that is actually displayed at the display or panel. For example, a mask layer may include a top portion and a bottom portion of a display area, but the middle portion of the mask layer may be empty. In some examples, there may be multiple mask layers to represent different portions of a display area. Also, for certain portions of a display area, the content of different mask layers may overlap with one another. Accordingly, a mask layer may represent a portion of a display area that may or may not overlap with other mask layers.

FIG. 4 is a diagram 400 illustrating an example mask layer for display processing. More specifically, diagram 400 depicts one type of mask layer that may represent portions of a display panel. As shown in FIG. 4, diagram 400 includes mask layer 402 including top regions 410 and bottom regions 420. Top regions 410 include region 411, region 412, region 413, and region 414, and bottom regions 420 include region 421, region 422, region 423, and region 424. As depicted in FIG. 4, mask layer 402 may represent the different regions that are displayed on a display panel.

Some types of displays may use a certain type of mask layer (e.g., a shape mask layer) to reshape a display frame. For instance, a mask layer may reshape the display frame to provide more optimized visual shapes at the display panel (e.g., improved round corners, improved circular shape, improved rectangular shape, etc.). These types of mask layers (e.g., shape mask layers) may be processed by software (e.g., graphics processing unit (GPU) software or central processing unit (CPU) software) or by hardware (e.g., display processing unit (DPU) hardware). Also, these mask layers may be processed by other specific types of hardware logic modules (e.g., modules in a display driver integrated circuit (DDIC) or bridge chips). In some aspects, these types of mask layers (e.g., shape mask layers) may be based on certain unit, such as a pixel. That is, the shape generation basis unit of the shape mask layers may be a single pixel.

Some aspects of display processing may utilize different types of display panels, such as video mode panels or command mode panels. Video mode panels may be utilized when a display does not provide internal memory for the display data, while command mode panels may be utilized when the display has access to the internal frame buffer memory. Both video mode panels and command mode panels may be utilized with high speed interfaces and/or low power interfaces. Video mode panels (e.g., video mode low-temperature polycrystalline oxide (LTPO) organic light-emitting diode (OLED) panels) have been utilized in display processing for a number of years. Certain types of video mode panels (e.g., LTPO OLED panels) may support a variety of refresh rates (e.g., refresh rates of 1 Hz to 120 Hz). This may result in a host chip that is controlling the video mode to experience a decent amount of power consumption. For instance, the host chip may need to refresh at a certain frame rate (e.g., 1 frame-per-second (FPS)). In some aspects, certain frame rates may be utilized with different types of content and different levels of light. For example, a frame rate of 1 Hz may be utilized with a static content frame with high ambient light, a frame rate of 15 Hz may be utilized with a static content frame with low ambient light, and a frame rate of 120 Hz may be utilized with user interface (UI) animations or games. Frame rates of 30 Hz, 60 Hz, or 90 Hz may be utilized for a number of different scenarios.

As smart phones and user equipments (UEs) become more advanced, any advantages of command mode panels may decrease, and the disadvantages of command mode panels may become more obvious. For example, command mode panels may be more expensive compared to video mode panels. Further, command mode panels may include a larger physical size for display driver integrated circuits (DDICs). Also, command mode panels may become less desirable if a power consumption advantage disappears compared to video mode panels. Moreover, the increased utilization of certain types of display panels (e.g., LTPO OLED display panels) may result in video mode panels becoming more relevant. Accordingly, there are an increasing number of reasons to utilize video mode panels over command mode panels.

Some types of static displays (e.g., screen-door effect (SDE) static displays) may be designed to use a controller (e.g., a last level cache controller (LLCC)) to cache an image from a memory (e.g., a double data rate (DDR) memory). In some instances, if a content updating idle occurs, a certain buffer (e.g., a buffer for a GPU composition result) may be written to the controller (e.g., LLCC) to reduce an amount of access at a DDR memory. By doing so, compared to a regular frame refreshing, the display driver software (SW) thread run-time at a CPU may be reduced a significant amount (e.g., reduced from 3 ms to 0.8 ms). This may be due to a reduced amount of programming (e.g., pipes programming) and/or a reduced amount of software (SW) event controlling. However, a thread that runs in the CPU as a real time thread may still contribute to power consumption (e.g., 10 mA to 20 mA of power consumption). This light-weight display thread may still be a CPU real-time task which may keep the CPU awake and may contribute to the consumed CPU power. In one instance, display software threads may contribute to a high amount of CPU power utilization, as they are a frequently running on a real-time thread in the CPU.

Figure 5:
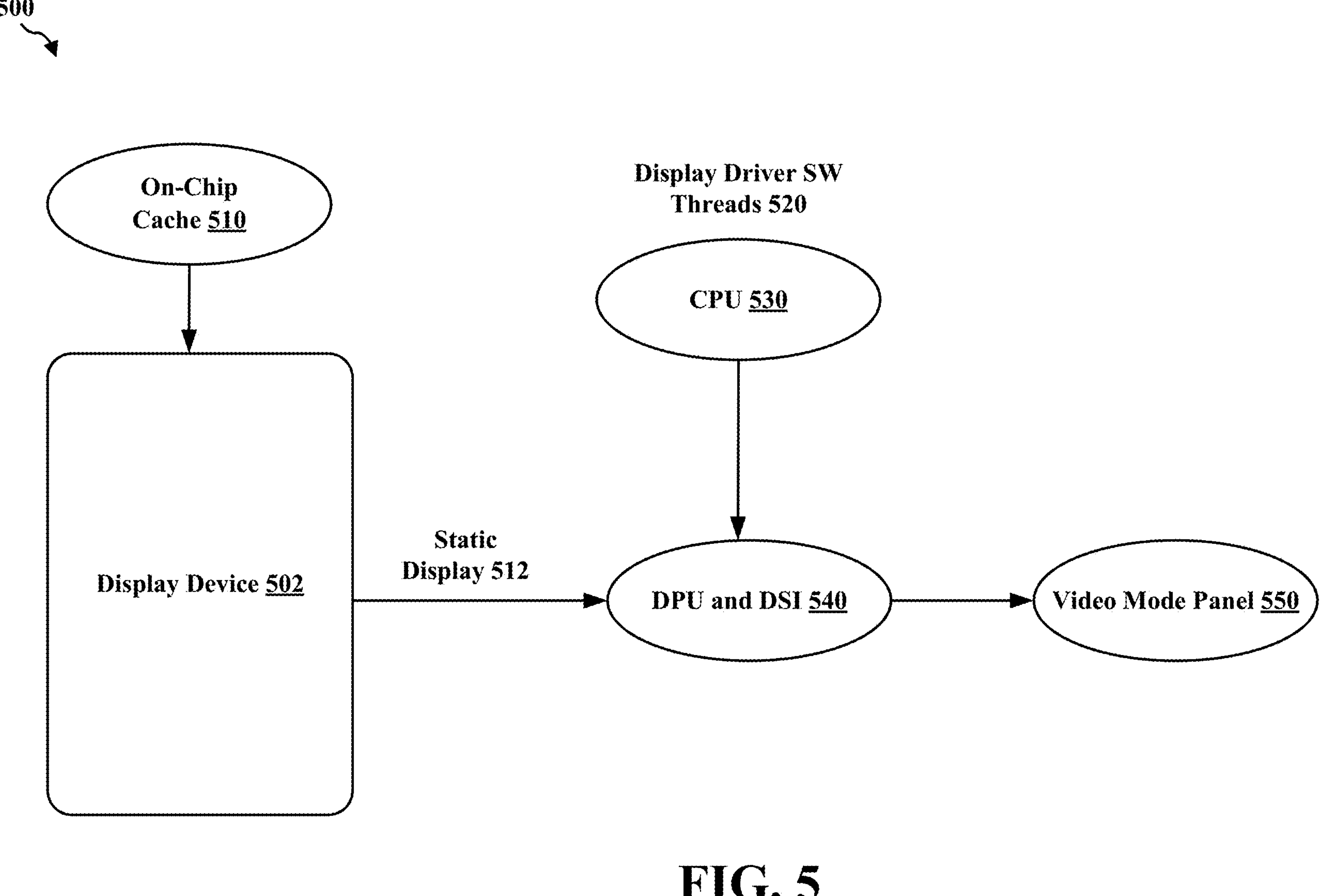
FIG. 5 is a diagram illustrating an example display thread procedure for a display device in display processing.

FIG. 5 is a diagram 500 illustrating an example of a display thread procedure for a display device. More specifically, diagram 500 depicts a display thread at a CPU during a static display (i.e., video mode). As shown in FIG. 5, diagram 500 includes display device 502, on-chip cache 510 (e.g., LLCC on-chip cache), static display 512, display driver software threads 520, CPU 530 (e.g., system on-chip (SOC) CPU), DPU and display serial interface (DSI) 540, and video mode panel 550 (e.g., video mode LTPO OLED panel). FIG. 5 depicts that display device 502 includes on-chip cache 510 while running a static display. Further, FIG. 5 depicts that display driver software threads 520 are running on CPU 530 before being processed at DPU and DSI 540. After processing at DPU and DSI 540, video mode panel 550 may display the output. Accordingly, FIG. 5 illustrates that display driver software threads 520 utilize a high amount of power at the CPU 530 during the static display 512 (i.e., video mode) at the display device 502.

As indicated herein, some video mode static display solutions (e.g., video mode static display on-chip LLCC cache solutions) may keep the CPU active while running software threads. By doing so, a high amount of power at the CPU may be utilized. Further, these video mode static display solutions may experience a high amount of DDR memory accessing. Based on the above, it may be beneficial to determine how to reduce the amount of power utilized at the CPU for display driver software threads. For instance, it may be beneficial to determine how to reduce the amount of power utilized at the CPU for display driver software threads during a static display (i.e., video mode). For example, it may be beneficial for smartphone vendors to reduce the amount of power utilized at the CPU for display driver software threads. It may also be beneficial to reduce an amount of DDR memory accessing that is associated with the display driver software threads.

Aspects of the present disclosure may utilize methods to reduce the amount of power utilized at a CPU for display driver software threads. For instance, aspects of the present disclosure may reduce the amount of power utilized at a CPU for display driver software threads during a static display (i.e., video mode). For example, aspects of the present disclosure may provide software vendors a solution to reduce the amount of power utilized at the CPU for display driver software threads. Additionally, in some instances, aspects of the present disclosure may allow for a reduction in an amount of DDR memory accessing associated with the display driver software threads. Moreover, aspects presented herein may schedule display software threads in order to solve the aforementioned power consumption issues. For instance, aspects presented herein may schedule display software threads at CPUs and digital signal processors (DSPs) (e.g., low power DSPs) for static displays and other scenarios.

In some instances, aspects of the present disclosure may solve the aforementioned power consumption issues by utilizing a static display scheduling flow. For instance, if the contents of a frame are not updated for a threshold time period, a static display may occur. If a static display occurs, the last frame content may be written back to the controller (e.g., LLCC) or memory (e.g., DDR) as a frame cache. If this occurs, the host (e.g., display driver or controller) may switch the display panel to a lower frame rate or FPS. Next, the host (e.g., display driver or controller) may switch the control of display software threads from a CPU to a DSP (e.g., a low power DSP). This control switch may occur by a number of procedures. For instance, during a host system booting, a number of groups (e.g., two groups) of display software driver threads may be established individually in a CPU and a DSP. During the host system run-time, display subsystem controlling tasks may be handed-over from a CPU thread group to a DSP thread group, or vice versa. Additionally, a static display (i.e., an idle timeout) may trigger a display subsystem controlling task handover from the CPU to the DSP.

In some aspects, if a frame content updates or starts (re-starts) updating, the host (e.g., display driver or controller) may schedule or switch control of the display software threads from the DSP to the CPU. Also, the host (e.g., display driver or controller) may switch the frame rate of the display panel from a current frame rate (e.g., a current FPS) to a higher frame rate (e.g., a higher FPS). After switching the frame rate, the host (e.g., display driver or controller) may compose a number of frames or layers that are associated with the display software threads (e.g., newly updated frames or layers). That is, the host (e.g., display driver or controller) may compose a number of frames or layers based on switching the frame rate.

FIG. 6 is a diagram 600 illustrating an example of a display thread procedure for a display device. More specifically, diagram 600 depicts a display thread at a CPU and a DSP during a static display (i.e., video mode). As shown in FIG. 6, diagram 600 includes display device 602, on-chip cache 610 (e.g., LLCC on-chip cache), static display 612, display driver software thread group 620, CPU 630 (e.g., system on-chip (SOC) CPU)), DPU and DSI 640, video mode panel 650 (e.g., video mode LTPO OLED panel), display driver software thread group 660, digital signal processor (DSP) 670, and DPU control handover 680. FIG. 6 depicts that display device 602 includes on-chip cache 610 while running a static display 612. Further, FIG. 6 depicts that display driver software thread group 620 is running on CPU 630 and display driver software thread group 660 is running on DSP 670. There may be a DPU control handover 680 to transfer or switch the control of one or both of the thread groups (e.g., the display driver software thread group 620 and/or the display driver software thread group 660). For example, DPU control handover 680 may allow display driver software thread group 620 to be run on the DSP 670. Also, DPU control handover 680 may allow display driver software thread group 660 to be run on the CPU 630. The display driver software thread group 620 and the display driver software thread group 660 may then be transferred to the DPU and DSI 640. After processing at DPU and DSI 640, video mode panel 650 may display the output. Accordingly, FIG. 6 illustrates that display driver software thread group 620 and/or display driver software thread group 660 may be scheduled to run on the CPU 630 and/or the DSP 670. By doing so, this may help to reduce an amount of power consumed at the CPU 630 during the static display 612 (i.e., video mode) at the display device 602.

Additionally, aspects of the present disclosure may schedule the control of display driver software threads on a CPU and a DSP via a number of measures. For example, aspects presented herein may schedule the control of display driver software threads via a general display software thread cross-processor run-time scheduling strategy. In order to do so, a host (e.g., display driver or controller) may monitor the loading time of current display software threads tasks. For instance, the host (e.g., display driver or controller) may monitor the loading time of layer numbers, display features/functions numbers, and other tasks. If the loading time of a current display software thread is low and the execution time specifications are not stringent (e.g., low frame rate or FPS), the host (e.g., display driver or controller) may schedule or switch the control of the display software thread from a CPU to a DSP, or vice versa. For example, the host (e.g., display driver or controller) may schedule or switch the control of a display software thread based on: (1) a single layer video play-back without a complex run-time tone mapping; (2) a static display; or (3) a low frame rate or FPS (e.g., 1 Hz or less). The display software control switch may be triggered by a number of events. For instance, a touch event at the display device, a system performance lock at the display device, a system application specification change, or a display software tasks loading time change may trigger the display software control to switch from a CPU to a DSP, or switch from the DSP to the CPU. Further, the display software tasks may be dynamically scheduled at the CPU and the DSP. Also, the execution of the display software tasks may be divided between the CPU and the DSP.

FIG. 7 is a diagram 700 illustrating an example of a display thread procedure for a display device. More specifically, diagram 700 depicts a display thread at a CPU and a DSP during a static display (i.e., video mode). As shown in FIG. 7, diagram 700 includes display driver software tasks 710, run-time frame, layers, and display function analysis 720, display driver software thread group 730, CPU 740 (e.g., system on-chip (SOC) CPU), DPU control handover 750, display driver software thread group 760, DSP 770, and DPU and DSI 780. FIG. 7 depicts that display driver software tasks 710 are run for a display device with a static display. Also, run-time frame, layers, and display function analysis 720 may be performed on the display driver software tasks 710. Further, FIG. 7 depicts that display driver software thread group 730 is running on CPU 740 and display driver software thread group 760 is running on DSP 770. There may be a DPU control handover 750 to transfer or switch the control of the display driver software thread group 730 or the display driver software thread group 760. For example, DPU control handover 750 may allow display driver software thread group 730 to be run on the DSP 770. Also, DPU control handover 750 may allow display driver software thread group 760 to be run on the CPU 740. The display driver software thread group 730 and the display driver software thread group 760 may then be transferred to the DPU and DSI 780. After processing at DPU and DSI 780, a video mode panel may display the output from the processing. Accordingly, FIG. 7 illustrates that display driver software thread group 730 and/or display driver software thread group 760 may be scheduled to run on the CPU 740 and/or the DSP 770. By doing so, this may help to reduce the amount of power consumed at the CPU 740 during a static display (i.e., video mode) at a display device.

Aspects of the present disclosure may include a number of benefits or advantages. For instance, aspects presented herein may transfer or switch the control of a display driver software thread to a DSP in order to offload power consumption from the CPU. By doing so, aspects of the present disclosure may reduce the power consumption at a CPU without any performance penalty. Additionally, aspects presented herein may execute a display driver software thread via multiple individual threads (e.g., two threads) at multiple devices (e.g., a CPU and a DSP). Further, aspects presented herein may execute software for a static display via a display software thread running on a DSP. Moreover, aspects presented herein may execute DPU hardware programming via run-time scheduling at a CPU, a DSP, and/or other processors.

Figure 8:
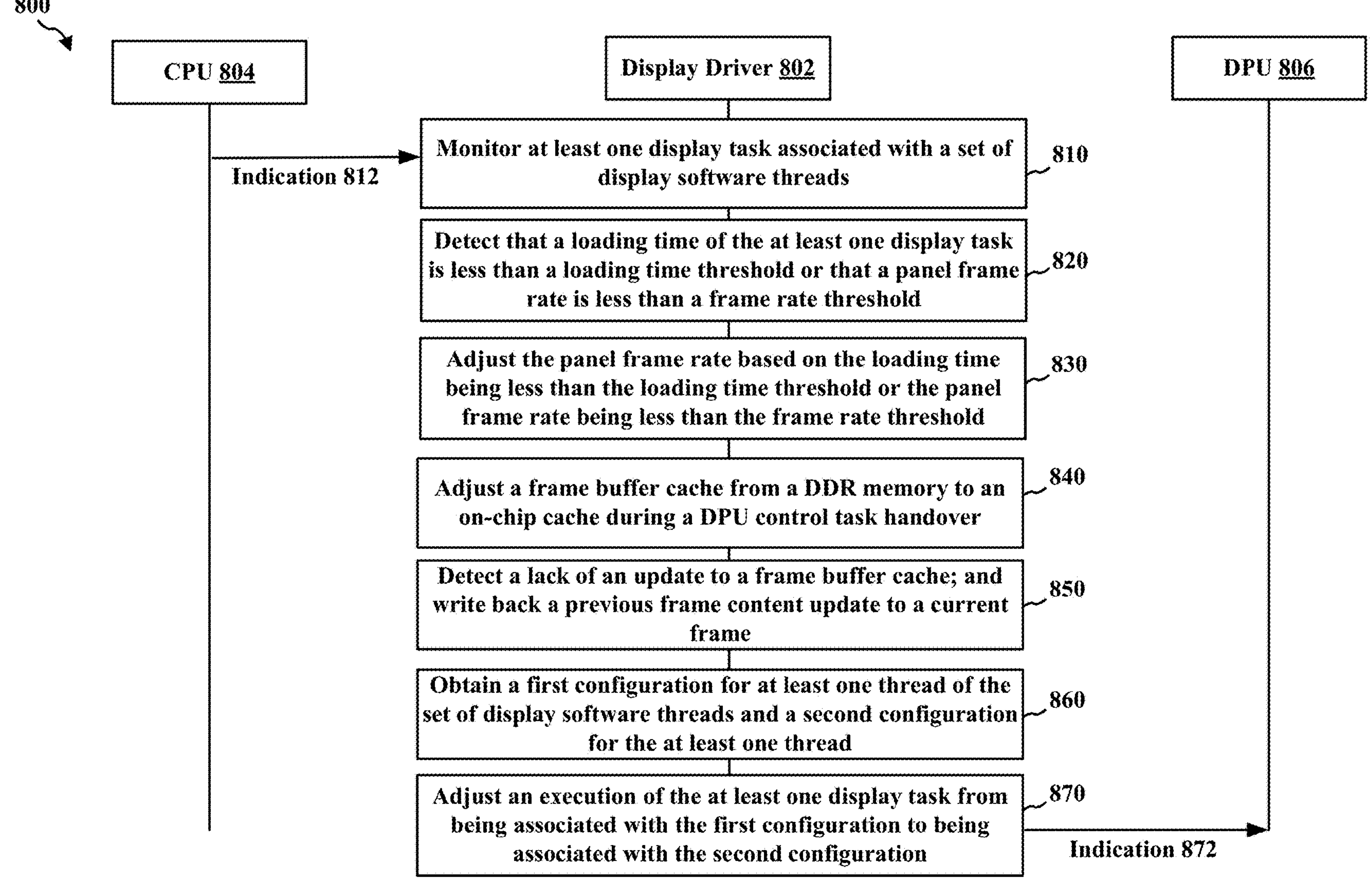
FIG. 8 is a communication flow diagram illustrating example communications between a CPU, a display driver, and a DPU.

FIG. 8 is a communication flow diagram 800 of display processing in accordance with one or more techniques of this disclosure. As shown in FIG. 8, diagram 800 includes example communications between display driver 802 (e.g., software running on a CPU for controlling a DPU or a processor for controlling a DPU), CPU 804 (or other central processor), and DPU 806 (or other display processor), in accordance with one or more techniques of this disclosure.

At 810, display driver 802 may monitor at least one display task associated with a set of display software threads, where the set of display software threads corresponds to a set of display features. When monitoring the at least one display task associated with the set of display software threads, display driver 802 may receive an indication of the at least one display task (e.g., receive indication 812 from CPU 804). In some aspects, the set of display software threads may include a first group of display software threads and a second group of display software threads, and monitoring the at least one display task may include: monitoring the first group of display software threads and the second group of display software threads. The at least one display task may be associated with at least one of: a frame layer, a frame geometry, or a hardware display link. Further, the at least one display task may correspond to at least one first task for one or more of: display hardware, a display processing unit (DPU), or a display serial interface (DSI).

At 820, display driver 802 may detect that a loading time of the at least one display task is less than a loading time threshold or that a panel frame rate is less than a frame rate threshold. The loading time threshold or the frame rate threshold may be associated with at least one of: (1) a single layer frame or a limited layer frame, (2) a static display, or (3) a frames-per-second (FPS) being below an FPS threshold.

At 830, display driver 802 may adjust the panel frame rate based on the loading time of the at least one display task being less than the loading time threshold or the panel frame rate being less than the frame rate threshold. The panel frame rate may be decreased to a lower frames-per-second (FPS) from a current FPS if the loading time of the at least one display task is less than the loading time threshold, and the panel frame rate may be increased to a higher FPS from the current FPS if the panel frame rate is less than the frame rate threshold. In some instances, the lower FPS may be 1 Hz, 5 Hz, 10 Hz, 15 Hz, or 30 Hz, and the higher FPS may be 30 Hz, 60 Hz, 90 Hz, or 120 Hz.

At 840, display driver 802 may adjust a frame buffer cache from a double data rate (DDR) memory to an on-chip cache during a display processing unit (DPU) control task handover, where the frame buffer cache is adjusted based on detecting that the loading time of the at least one display task is less than the loading time threshold or that the panel frame rate is less than the frame rate threshold.

At 850, display driver 802 may detect a lack of an update to a frame buffer cache based on the loading time of the at least one display task being less than the loading time threshold or the panel frame rate being less than the frame rate threshold. Also, at 850, display driver 802 may write back a previous frame content update to a current frame based on detecting the lack of the update to the frame buffer cache.

At 860, display driver 802 may obtain a first configuration for at least one thread of the set of display software threads and a second configuration for the at least one thread based on the loading time of the at least one display task being less than the loading time threshold or the panel frame rate being less than the frame rate threshold. In some instances, the first configuration of the at least one thread may be associated with a low power processor or a digital signal processor (DSP), and obtaining the first configuration of the at least one thread may include: receiving an indication of an adjustment to the first configuration from a central processing unit (CPU) to the low power processor or the DSP. Also, the first configuration of the at least one thread may be associated with a low power processor or a digital signal processor (DSP), and the second configuration of the at least one thread may be associated with a central processing unit (CPU).

At 870, display driver 802 may adjust an execution of the at least one display task from being associated with the first configuration for the at least one thread to being associated with the second configuration for the at least one thread. In some instances, adjusting the execution of the at least one display task may include: dividing the execution of the at least one display task between being associated with the first configuration of the at least one thread and being associated with the second configuration of the at least one thread. The execution of the at least one display task may be adjusted based on at least one of: a touch event, a system performance lock, one or more system application specifications, a change in a display software task loading time, or a change in the panel frame rate. Additionally, the execution of the at least one display task may be dynamically scheduled for at least one of: a low power processor, a digital signal processor (DSP), or a central processing unit (CPU). After adjusting the execution of the at least one display task from being associated with the first configuration to being associated with the second configuration, display driver 802 may transmit an indication of the execution adjustment (e.g., transmit indication 872 to DPU 806).

Figure 9:
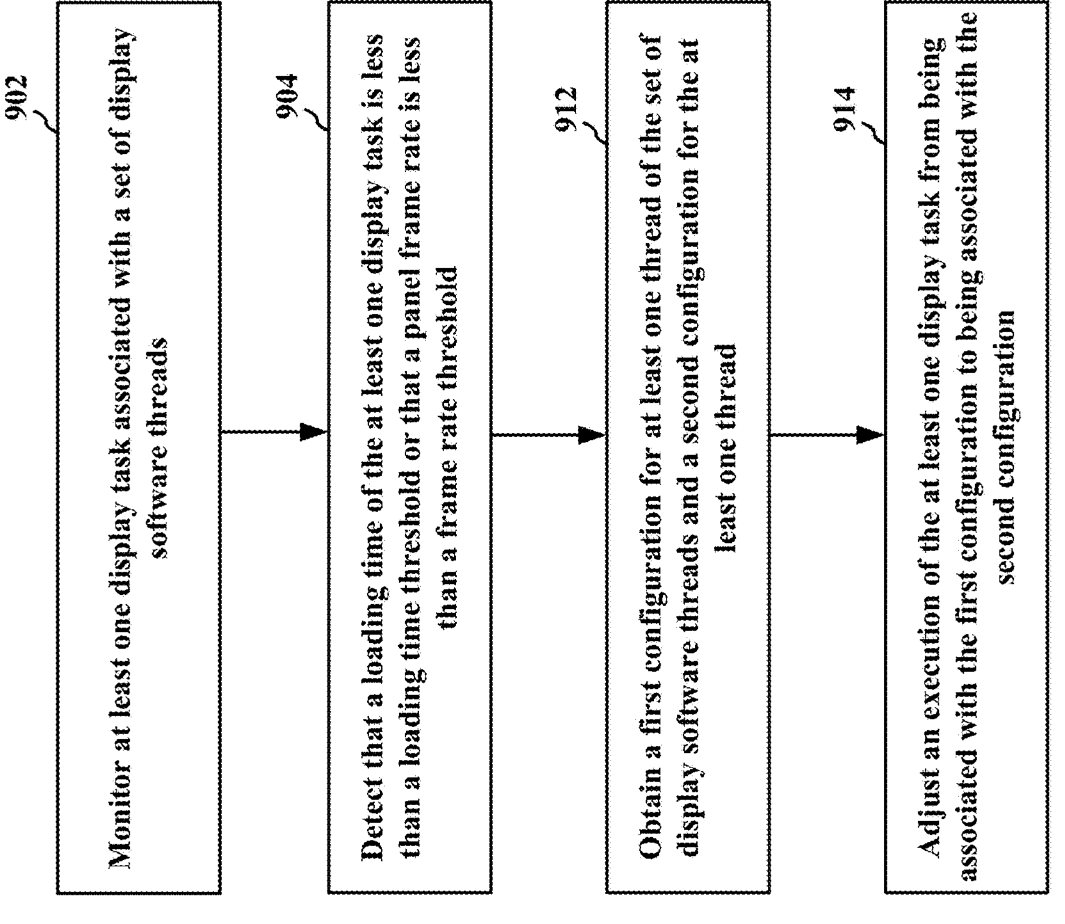
FIG. 9 is a flowchart of an example method of display processing.

FIG. 9 is a flowchart 900 of an example method of display processing in accordance with one or more techniques of this disclosure. The method may be performed by a display driver (e.g., software running on a CPU for controlling a DPU or a processor for controlling a DPU), a CPU (or other central processor), a DPU (or other display processor), a DDIC, an apparatus for display processing, a wireless communication device, and/or any apparatus that may perform display processing as used in connection with the examples of FIGS. 1-8.

At 902, the display driver may monitor at least one display task associated with a set of display software threads, where the set of display software threads corresponds to a set of display features, as described in connection with the examples in FIGS. 1-8. For example, as described in 810 of FIG. 8, display driver 802 may monitor at least one display task associated with a set of display software threads, where the set of display software threads corresponds to a set of display features. Further, step 902 may be performed by display processor 127 in FIG. 1. When monitoring the at least one display task associated with the set of display software threads, the display driver may receive an indication of the at least one display task. In some aspects, the set of display software threads may include a first group of display software threads and a second group of display software threads, and monitoring the at least one display task may include: monitoring the first group of display software threads and the second group of display software threads. The at least one display task may be associated with at least one of: a frame layer, a frame geometry, or a hardware display link. Further, the at least one display task may correspond to at least one first task for one or more of: display hardware, a display processing unit (DPU), or a display serial interface (DSI).

At 904, the display driver may detect that a loading time of the at least one display task is less than a loading time threshold or that a panel frame rate is less than a frame rate threshold, as described in connection with the examples in FIGS. 1-8. For example, as described in 820 of FIG. 8, display driver 802 may detect that a loading time of the at least one display task is less than a loading time threshold or that a panel frame rate is less than a frame rate threshold. Further, step 904 may be performed by display processor 127 in FIG. 1. The loading time threshold or the frame rate threshold may be associated with at least one of: (1) a single layer frame or a limited layer frame, (2) a static display, or (3) a frames-per-second (FPS) being below an FPS threshold.

At 912, the display driver may obtain a first configuration for at least one thread of the set of display software threads and a second configuration for the at least one thread based on the loading time of the at least one display task being less than the loading time threshold or the panel frame rate being less than the frame rate threshold, as described in connection with the examples in FIGS. 1-8. For example, as described in 860 of FIG. 8, display driver 802 may obtain a first configuration for at least one thread of the set of display software threads and a second configuration for the at least one thread based on the loading time of the at least one display task being less than the loading time threshold or the panel frame rate being less than the frame rate threshold. Further, step 912 may be performed by display processor 127 in FIG. 1. In some instances, the first configuration of the at least one thread may be associated with a low power processor or a digital signal processor (DSP), and obtaining the first configuration of the at least one thread may include: receiving an indication of an adjustment to the first configuration from a central processing unit (CPU) to the low power processor or the DSP. Also, the first configuration of the at least one thread may be associated with a low power processor or a digital signal processor (DSP), and the second configuration of the at least one thread may be associated with a central processing unit (CPU).

At 914, the display driver may adjust an execution of the at least one display task from being associated with the first configuration for the at least one thread to being associated with the second configuration for the at least one thread, as described in connection with the examples in FIGS. 1-8. For example, as described in 870 of FIG. 8, display driver 802 may adjust an execution of the at least one display task from being associated with the first configuration for the at least one thread to being associated with the second configuration for the at least one thread. Further, step 914 may be performed by display processor 127 in FIG. 1. In some instances, adjusting the execution of the at least one display task may include: dividing the execution of the at least one display task between being associated with the first configuration of the at least one thread and being associated with the second configuration of the at least one thread. The execution of the at least one display task may be adjusted based on at least one of: a touch event, a system performance lock, one or more system application specifications, a change in a display software task loading time, or a change in the panel frame rate. Additionally, the execution of the at least one display task may be dynamically scheduled for at least one of: a low power processor, a digital signal processor (DSP), or a central processing unit (CPU). After adjusting the execution of the at least one display task from being associated with the first configuration to being associated with the second configuration, display driver may transmit an indication of the execution adjustment.

Figure 10:
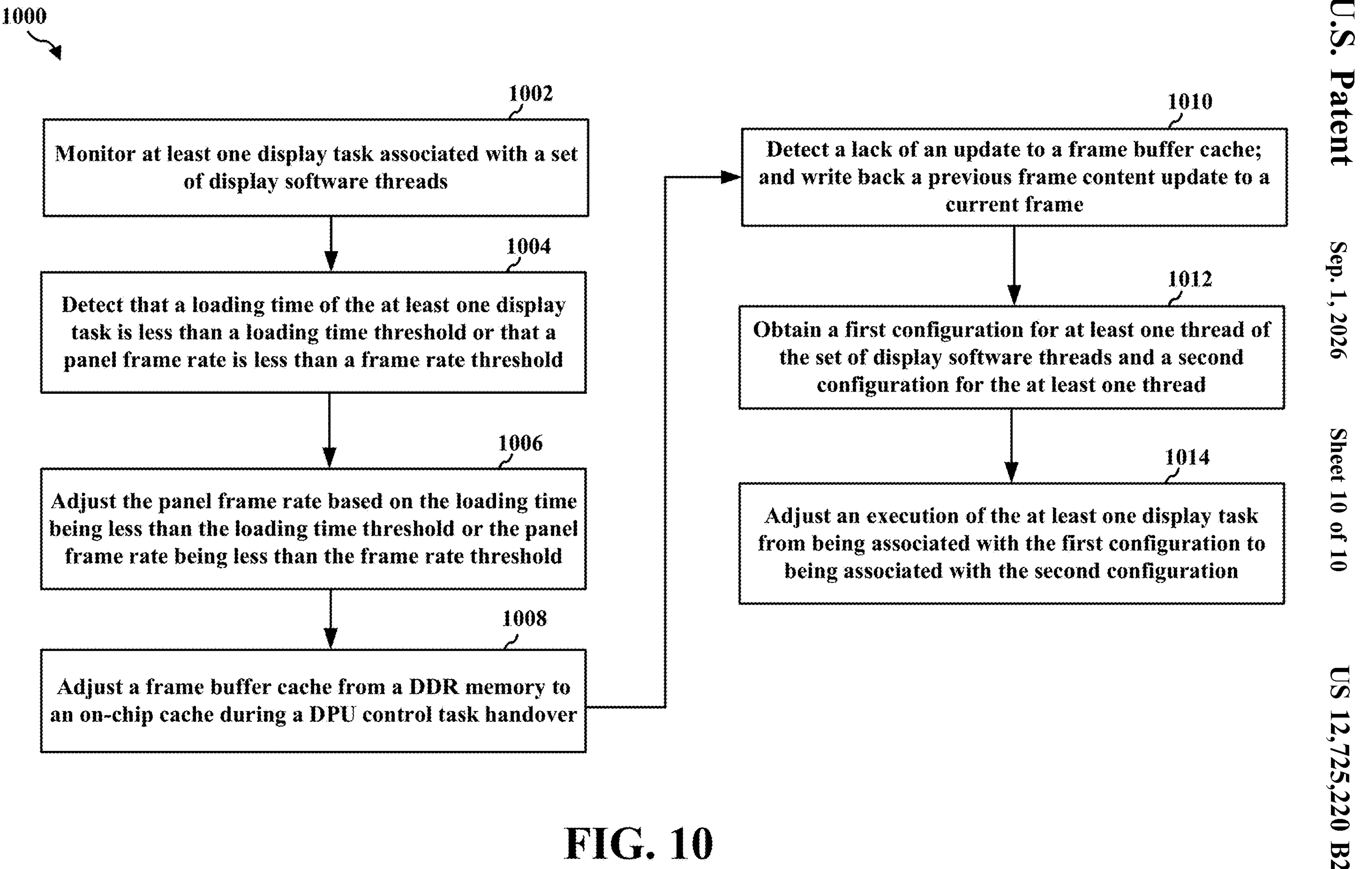
FIG. 10 is a flowchart of an example method of display processing.

FIG. 10 is a flowchart 1000 of an example method of display processing in accordance with one or more techniques of this disclosure. The method may be performed by a display driver (e.g., software running on a CPU for controlling a DPU or a processor for controlling a DPU), a CPU (or other central processor), a DPU (or other display processor), a DDIC, an apparatus for display processing, a wireless communication device, and/or any apparatus that may perform display processing as used in connection with the examples of FIGS. 1-8.

At 1002, the display driver may monitor at least one display task associated with a set of display software threads, where the set of display software threads corresponds to a set of display features, as described in connection with the examples in FIGS. 1-8. For example, as described in 810 of FIG. 8, display driver 802 may monitor at least one display task associated with a set of display software threads, where the set of display software threads corresponds to a set of display features. Further, step 1002 may be performed by display processor 127 in FIG. 1. When monitoring the at least one display task associated with the set of display software threads, the display driver may receive an indication of the at least one display task. In some aspects, the set of display software threads may include a first group of display software threads and a second group of display software threads, and monitoring the at least one display task may include: monitoring the first group of display software threads and the second group of display software threads. The at least one display task may be associated with at least one of: a frame layer, a frame geometry, or a hardware display link. Further, the at least one display task may correspond to at least one first task for one or more of: display hardware, a display processing unit (DPU), or a display serial interface (DSI).

At 1004, the display driver may detect that a loading time of the at least one display task is less than a loading time threshold or that a panel frame rate is less than a frame rate threshold, as described in connection with the examples in FIGS. 1-8. For example, as described in 820 of FIG. 8, display driver 802 may detect that a loading time of the at least one display task is less than a loading time threshold or that a panel frame rate is less than a frame rate threshold. Further, step 1004 may be performed by display processor 127 in FIG. 1. The loading time threshold or the frame rate threshold may be associated with at least one of: (1) a single layer frame or a limited layer frame, (2) a static display, or (3) a frames-per-second (FPS) being below an FPS threshold.

At 1006, the display driver may adjust the panel frame rate based on the loading time of the at least one display task being less than the loading time threshold or the panel frame rate being less than the frame rate threshold, as described in connection with the examples in FIGS. 1-8. For example, as described in 830 of FIG. 8, display driver 802 may adjust the panel frame rate based on the loading time of the at least one display task being less than the loading time threshold or the panel frame rate being less than the frame rate threshold. Further, step 1006 may be performed by display processor 127 in FIG. 1. The panel frame rate may be decreased to a lower frames-per-second (FPS) from a current FPS if the loading time of the at least one display task is less than the loading time threshold, and the panel frame rate may be increased to a higher FPS from the current FPS if the panel frame rate is less than the frame rate threshold. In some instances, the lower FPS may be 1 Hz, 5 Hz, 10 Hz, 15 Hz, or 30 Hz, and the higher FPS may be 30 Hz, 60 Hz, 90 Hz, or 120 Hz.

At 1008, the display driver may adjust a frame buffer cache from a double data rate (DDR) memory to an on-chip cache during a display processing unit (DPU) control task handover, where the frame buffer cache is adjusted based on detecting that the loading time of the at least one display task is less than the loading time threshold or that the panel frame rate is less than the frame rate threshold, as described in connection with the examples in FIGS. 1-8. For example, as described in 840 of FIG. 8, display driver 802 may adjust a frame buffer cache from a double data rate (DDR) memory to an on-chip cache during a display processing unit (DPU) control task handover, where the frame buffer cache is adjusted based on detecting that the loading time of the at least one display task is less than the loading time threshold or that the panel frame rate is less than the frame rate threshold. Further, step 1008 may be performed by display processor 127 in FIG. 1.

At 1010, the display driver may detect a lack of an update to a frame buffer cache based on the loading time of the at least one display task being less than the loading time threshold or the panel frame rate being less than the frame rate threshold. Also, at 1010, display driver may write back a previous frame content update to a current frame based on detecting the lack of the update to the frame buffer cache, as described in connection with the examples in FIGS. 1-8. For example, as described in 850 of FIG. 8, display driver 802 may detect a lack of an update to a frame buffer cache based on the loading time of the at least one display task being less than the loading time threshold or the panel frame rate being less than the frame rate threshold; and write back a previous frame content update to a current frame based on detecting the lack of the update to the frame buffer cache. Further, step 1010 may be performed by display processor 127 in FIG. 1.

At 1012, the display driver may obtain a first configuration for at least one thread of the set of display software threads and a second configuration for the at least one thread based on the loading time of the at least one display task being less than the loading time threshold or the panel frame rate being less than the frame rate threshold, as described in connection with the examples in FIGS. 1-8. For example, as described in 860 of FIG. 8, display driver 802 may obtain a first configuration for at least one thread of the set of display software threads and a second configuration for the at least one thread based on the loading time of the at least one display task being less than the loading time threshold or the panel frame rate being less than the frame rate threshold. Further, step 1012 may be performed by display processor 127 in FIG. 1. In some instances, the first configuration of the at least one thread may be associated with a low power processor or a digital signal processor (DSP), and obtaining the first configuration of the at least one thread may include: receiving an indication of an adjustment to the first configuration from a central processing unit (CPU) to the low power processor or the DSP. Also, the first configuration of the at least one thread may be associated with a low power processor or a digital signal processor (DSP), and the second configuration of the at least one thread may be associated with a central processing unit (CPU).

At 1014, the display driver may adjust an execution of the at least one display task from being associated with the first configuration for the at least one thread to being associated with the second configuration for the at least one thread, as described in connection with the examples in FIGS. 1-8. For example, as described in 870 of FIG. 8, display driver 802 may adjust an execution of the at least one display task from being associated with the first configuration for the at least one thread to being associated with the second configuration for the at least one thread. Further, step 1014 may be performed by display processor 127 in FIG. 1. In some instances, adjusting the execution of the at least one display task may include: dividing the execution of the at least one display task between being associated with the first configuration of the at least one thread and being associated with the second configuration of the at least one thread. The execution of the at least one display task may be adjusted based on at least one of: a touch event, a system performance lock, one or more system application specifications, a change in a display software task loading time, or a change in the panel frame rate. Additionally, the execution of the at least one display task may be dynamically scheduled for at least one of: a low power processor, a digital signal processor (DSP), or a central processing unit (CPU). After adjusting the execution of the at least one display task from being associated with the first configuration to being associated with the second configuration, display driver may transmit an indication of the execution adjustment.

In configurations, a method or an apparatus for display processing is provided. The apparatus may be a display driver (e.g., software running on a CPU for controlling a DPU or a processor for controlling a DPU), a CPU (or other central processor), a DPU (or other display processor), a DDIC, an apparatus for display processing, and/or some other processor that may perform display processing. In aspects, the apparatus may be the display processor 127 within the device 104, or may be some other hardware within the device 104 or another device. The apparatus, e.g., display processor 127, may include means for monitoring at least one display task associated with a set of display software threads, where the set of display software threads corresponds to a set of display features. The apparatus, e.g., display processor 127, may include means for detecting that a loading time of the at least one display task is less than a loading time threshold or that a panel frame rate is less than a frame rate threshold. The apparatus, e.g., display processor 127, may include means for obtaining a first configuration for at least one thread of the set of display software threads and a second configuration for the at least one thread based on the loading time of the at least one display task being less than the loading time threshold or the panel frame rate being less than the frame rate threshold. The apparatus, e.g., display processor 127, may include means for adjusting an execution of the at least one display task from being associated with the first configuration for the at least one thread to being associated with the second configuration for the at least one thread. The apparatus, e.g., display processor 127, may include means for adjusting the panel frame rate based on the loading time of the at least one display task being less than the loading time threshold or the panel frame rate being less than the frame rate threshold. The apparatus, e.g., display processor 127, may include means for adjusting a frame buffer cache from a double data rate (DDR) memory to an on-chip cache during a display processing unit (DPU) control task handover, where the frame buffer cache is adjusted based on detecting that the loading time of the at least one display task is less than the loading time threshold or that the panel frame rate is less than the frame rate threshold. The apparatus, e.g., display processor 127, may include means for detecting a lack of an update to a frame buffer cache based on the loading time of the at least one display task being less than the loading time threshold or the panel frame rate being less than the frame rate threshold. The apparatus, e.g., display processor 127, may include means for writing back a previous frame content update to a current frame based on detecting the lack of the update to the frame buffer cache.

The subject matter described herein may be implemented to realize one or more benefits or advantages. For instance, the described display processing techniques may be used by a display driver, a CPU, a DPU, a display processor, or some other processor that may perform display processing to implement the display driver thread run-time scheduling techniques described herein. This may also be accomplished at a low cost compared to other display processing techniques. Moreover, the display processing techniques herein may improve or speed up data processing or execution. Further, the display processing techniques herein may improve resource or data utilization and/or resource efficiency. Additionally, aspects of the present disclosure may utilize display driver thread run-time scheduling techniques in order to improve memory bandwidth efficiency and/or increase processing speed at a CPU or DPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term “processor,” as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term “processor,” as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for display processing, including a memory and at least one processor coupled to the memory and, based at least in part on information stored in the memory, the at least one processor is configured to: monitor at least one display task associated with a set of display software threads, where the set of display software threads corresponds to a set of display features; detect that a loading time of the at least one display task is less than a loading time threshold or that a panel frame rate is less than a frame rate threshold; obtain a first configuration for at least one thread of the set of display software threads and a second configuration for the at least one thread based on the loading time of the at least one display task being less than the loading time threshold or the panel frame rate being less than the frame rate threshold; and adjust an execution of the at least one display task from being associated with the first configuration for the at least one thread to being associated with the second configuration for the at least one thread.

Aspect 2 is the apparatus of aspect 1, where the at least one processor is further configured to: adjust the panel frame rate based on the loading time of the at least one display task being less than the loading time threshold or the panel frame rate being less than the frame rate threshold.

Aspect 3 is the apparatus of any of aspects 1 and 2, where the panel frame rate is decreased to a lower frames-per-second (FPS) from a current FPS if the loading time of the at least one display task is less than the loading time threshold, and where the panel frame rate is increased to a higher FPS from the current FPS if the panel frame rate is less than the frame rate threshold.

Aspect 4 is the apparatus of any of aspects 1 to 3, where the lower FPS is 1 Hz, 5 Hz, 10 Hz, 15 Hz, or 30 Hz, and where the higher FPS is 30 Hz, 60 Hz, 90 Hz, or 120 Hz.

Aspect 5 is the apparatus of any of aspects 1 to 4, where to adjust the execution of the at least one display task, the at least one processor is configured to: divide the execution of the at least one display task between being associated with the first configuration of the at least one thread and being associated with the second configuration of the at least one thread.

Aspect 6 is the apparatus of any of aspects 1 to 5, where the set of display software threads includes a first group of display software threads and a second group of display software threads, and where to monitor the at least one display task, the at least one processor is configured to: monitor the first group of display software threads and the second group of display software threads.

Aspect 7 is the apparatus of any of aspects 1 to 6, where the at least one processor is further configured to: adjust a frame buffer cache from a double data rate (DDR) memory to an on-chip cache during a display processing unit (DPU) control task handover, where the frame buffer cache is adjusted based on detecting that the loading time of the at least one display task is less than the loading time threshold or that the panel frame rate is less than the frame rate threshold.

Aspect 8 is the apparatus of any of aspects 1 to 7, where the at least one processor is further configured to: detect a lack of an update to a frame buffer cache based on the loading time of the at least one display task being less than the loading time threshold or the panel frame rate being less than the frame rate threshold; and write back a previous frame content update to a current frame based on detecting the lack of the update to the frame buffer cache.

Aspect 9 is the apparatus of any of aspects 1 to 8, where the loading time threshold or the frame rate threshold is associated with at least one of: (1) a single layer frame or a limited layer frame, (2) a static display, or (3) a frames-per-second (FPS) being below an FPS threshold.

Aspect 10 is the apparatus of any of aspects 1 to 9, where the first configuration of the at least one thread is associated with a low power processor or a digital signal processor (DSP), and where to obtain the first configuration of the at least one thread, the at least one processor is configured to: receive an indication of an adjustment to the first configuration from a central processing unit (CPU) to the low power processor or the DSP.

Aspect 11 is the apparatus of any of aspects 1 to 10, where the execution of the at least one display task is adjusted based on at least one of: a touch event, a system performance lock, one or more system application specifications, a change in a display software task loading time, or a change in the panel frame rate.

Aspect 12 is the apparatus of any of aspects 1 to 11, where the at least one display task is associated with at least one of: a frame layer, a frame geometry, or a hardware display link.

Aspect 13 is the apparatus of any of aspects 1 to 12, where the first configuration of the at least one thread is associated with a low power processor or a digital signal processor (DSP), and where the second configuration of the at least one thread is associated with a central processing unit (CPU).

Aspect 14 is the apparatus of any of aspects 1 to 13, where the at least one display task corresponds to at least one first task for one or more of: display hardware, a display processing unit (DPU), or a display serial interface (DSI).

Aspect 15 is the apparatus of any of aspects 1 to 14, where the execution of the at least one display task is dynamically scheduled for at least one of: a low power processor, a digital signal processor (DSP), or a central processing unit (CPU).

Aspect 16 is the apparatus of any of aspects 1 to 15, where the apparatus is a wireless communication device, further including at least one of an antenna or a transceiver coupled to the at least one processor.

Aspect 17 is a method of display processing for implementing any of aspects 1 to 16.

Aspect 18 is an apparatus for display processing including means for implementing any of aspects 1 to 16.

Aspect 19 is a computer-readable medium (e.g., a non-transitory computer-readable medium) storing computer executable code, the code when executed by at least one processor causes the at least one processor to implement any of aspects 1 to 16.

What is claimed is:

1. An apparatus for display processing, comprising:

a memory; and at least one processor coupled to the memory and, based at least in part on information stored in the memory, the at least one processor is configured to:

monitor at least one display task associated with a set of display software threads, wherein the set of display software threads corresponds to a set of display features;

detect that a loading time of the at least one display task is less than a loading time threshold or that a panel frame rate is less than a frame rate threshold;

obtain a first configuration for at least one thread of the set of display software threads and a second configuration for the at least one thread based on the loading time of the at least one display task being less than the loading time threshold or the panel frame rate being less than the frame rate threshold; and adjust an execution of the at least one display task from being associated with the first configuration for the at least one thread to being associated with the second configuration for the at least one thread.

2. The apparatus of claim 1, wherein the at least one processor is further configured to:

adjust the panel frame rate based on the loading time of the at least one display task being less than the loading time threshold or the panel frame rate being less than the frame rate threshold.

3. The apparatus of claim 2, wherein the panel frame rate is decreased to a lower frames-per-second (FPS) from a current FPS if the loading time of the at least one display task is less than the loading time threshold, and wherein the panel frame rate is increased to a higher FPS from the current FPS if the panel frame rate is less than the frame rate threshold.

4. The apparatus of claim 3, wherein the lower FPS is 1 Hz, 5 Hz, 10 Hz, 15 Hz, or 30 Hz, and wherein the higher FPS is 30 Hz, 60 Hz, 90 Hz, or 120 Hz.

5. The apparatus of claim 1, wherein to adjust the execution of the at least one display task, the at least one processor is configured to: divide the execution of the at least one display task between being associated with the first configuration of the at least one thread and being associated with the second configuration of the at least one thread.

6. The apparatus of claim 1, wherein the set of display software threads includes a first group of display software threads and a second group of display software threads, and wherein to monitor the at least one display task, the at least one processor is configured to: monitor the first group of display software threads and the second group of display software threads.

7. The apparatus of claim 1, wherein the at least one processor is further configured to:

adjust a frame buffer cache from a double data rate (DDR) memory to an on-chip cache during a display processing unit (DPU) control task handover, wherein the frame buffer cache is adjusted based on detecting that the loading time of the at least one display task is less than the loading time threshold or that the panel frame rate is less than the frame rate threshold.

8. The apparatus of claim 1, wherein the at least one processor is further configured to:

detect a lack of an update to a frame buffer cache based on the loading time of the at least one display task being less than the loading time threshold or the panel frame rate being less than the frame rate threshold; and write back a previous frame content update to a current frame based on detecting the lack of the update to the frame buffer cache.

9. The apparatus of claim 1, wherein the loading time threshold or the frame rate threshold is associated with at least one of: (1) a single layer frame or a limited layer frame, (2) a static display, or (3) a frames-per-second (FPS) being below an FPS threshold.

10. The apparatus of claim 1, wherein the first configuration of the at least one thread is associated with a low power processor or a digital signal processor (DSP), and wherein to obtain the first configuration of the at least one thread, the at least one processor is configured to: receive an indication of an adjustment to the first configuration from a central processing unit (CPU) to the low power processor or the DSP.

11. The apparatus of claim 1, wherein the execution of the at least one display task is adjusted based on at least one of: a touch event, a system performance lock, one or more system application specifications, a change in a display software task loading time, or a change in the panel frame rate.

12. The apparatus of claim 1, wherein the at least one display task is associated with at least one of: a frame layer, a frame geometry, or a hardware display link.

13. The apparatus of claim 1, wherein the first configuration of the at least one thread is associated with a low power processor or a digital signal processor (DSP), and wherein the second configuration of the at least one thread is associated with a central processing unit (CPU).

14. The apparatus of claim 1, wherein the at least one display task corresponds to at least one first task for one or more of: display hardware, a display processing unit (DPU), or a display serial interface (DSI).

15. The apparatus of claim 1, further comprising at least one of an antenna or a transceiver coupled to the at least one processor, wherein the apparatus is a wireless communication device, and wherein the execution of the at least one display task is dynamically scheduled for at least one of: a low power processor, a digital signal processor (DSP), or a central processing unit (CPU).

16. A method of display processing, comprising:

monitoring at least one display task associated with a set of display software threads, wherein the set of display software threads corresponds to a set of display features;

detecting that a loading time of the at least one display task is less than a loading time threshold or that a panel frame rate is less than a frame rate threshold;

obtaining a first configuration for at least one thread of the set of display software threads and a second configuration for the at least one thread based on the loading time of the at least one display task being less than the loading time threshold or the panel frame rate being less than the frame rate threshold; and adjusting an execution of the at least one display task from being associated with the first configuration for the at least one thread to being associated with the second configuration for the at least one thread.

17. The method of claim 16, further comprising:

adjusting the panel frame rate based on the loading time of the at least one display task being less than the loading time threshold or the panel frame rate being less than the frame rate threshold.

18. The method of claim 17, wherein the panel frame rate is decreased to a lower frames-per-second (FPS) from a current FPS if the loading time of the at least one display task is less than the loading time threshold, and wherein the panel frame rate is increased to a higher FPS from the current FPS if the panel frame rate is less than the frame rate threshold.

19. The method of claim 18, wherein the lower FPS is 1 Hz, 5 Hz, 10 Hz, 15 Hz, or 30 Hz, and wherein the higher FPS is 30 Hz, 60 Hz, 90 Hz, or 120 Hz.

20. The method of claim 16, wherein adjusting the execution of the at least one display task comprises: dividing the execution of the at least one display task between being associated with the first configuration of the at least one thread and being associated with the second configuration of the at least one thread.

21. The method of claim 16, wherein the set of display software threads includes a first group of display software threads and a second group of display software threads, and wherein monitoring the at least one display task comprises: monitoring the first group of display software threads and the second group of display software threads.

22. The method of claim 16, further comprising:

adjusting a frame buffer cache from a double data rate (DDR) memory to an on-chip cache during a display processing unit (DPU) control task handover, wherein the frame buffer cache is adjusted based on detecting that the loading time of the at least one display task is less than the loading time threshold or that the panel frame rate is less than the frame rate threshold.

23. The method of claim 16, further comprising:

detecting a lack of an update to a frame buffer cache based on the loading time of the at least one display task being less than the loading time threshold or the panel frame rate being less than the frame rate threshold; and writing back a previous frame content update to a current frame based on detecting the lack of the update to the frame buffer cache.

24. The method of claim 16, wherein the loading time threshold or the frame rate threshold is associated with at least one of: (1) a single layer frame or a limited layer frame, (2) a static display, or (3) a frames-per-second (FPS) being below an FPS threshold.

25. The method of claim 16, wherein the first configuration of the at least one thread is associated with a low power processor or a digital signal processor (DSP), and wherein obtaining the first configuration of the at least one thread comprises: receiving an indication of an adjustment to the first configuration from a central processing unit (CPU) to the low power processor or the DSP.

26. The method of claim 16, wherein the execution of the at least one display task is adjusted based on at least one of: a touch event, a system performance lock, one or more system application specifications, a change in a display software task loading time, or a change in the panel frame rate.

27. The method of claim 16, wherein the at least one display task is associated with at least one of: a frame layer, a frame geometry, or a hardware display link, and wherein the first configuration of the at least one thread is associated with a low power processor or a digital signal processor (DSP), and wherein the second configuration of the at least one thread is associated with a central processing unit (CPU).

28. The method of claim 16, wherein the at least one display task corresponds to at least one first task for one or more of: display hardware, a display processing unit (DPU), or a display serial interface (DSI), and wherein the execution of the at least one display task is dynamically scheduled for at least one of: a low power processor, a digital signal processor (DSP), or a central processing unit (CPU).

29. An apparatus for display processing, comprising:

means for monitoring at least one display task associated with a set of display software threads, wherein the set of display software threads corresponds to a set of display features;

means for detecting that a loading time of the at least one display task is less than a loading time threshold or that a panel frame rate is less than a frame rate threshold;

means for obtaining a first configuration for at least one thread of the set of display software threads and a second configuration for the at least one thread based on the loading time of the at least one display task being less than the loading time threshold or the panel frame rate being less than the frame rate threshold; and means for adjusting an execution of the at least one display task from being associated with the first configuration for the at least one thread to being associated with the second configuration for the at least one thread.

30. A non-transitory computer-readable medium storing computer executable code for display processing, the code when executed by a processor causes the processor to:

monitor at least one display task associated with a set of display software threads, wherein the set of display software threads corresponds to a set of display features;

detect that a loading time of the at least one display task is less than a loading time threshold or that a panel frame rate is less than a frame rate threshold;

obtain a first configuration for at least one thread of the set of display software threads and a second configuration for the at least one thread based on the loading time of the at least one display task being less than the loading time threshold or the panel frame rate being less than the frame rate threshold; and adjust an execution of the at least one display task from being associated with the first configuration for the at least least one thread to being associated with the second configuration for the at least one thread.

* * * * *